(12) United States Patent
Chien et al.

(10) Patent No.: US 7,550,400 B2
(45) Date of Patent: Jun. 23, 2009

(54) MULTIPLE LAYER NONWOVEN FABRIC STRUCTURES

(75) Inventors: William M. Chien, Houston, TX (US); Chia Y. Cheng, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 62 days.

(21) Appl. No.: 11/195,483

(22) Filed: Aug. 2, 2005

(65) Prior Publication Data

US 2007/0032158 A1 Feb. 8, 2007

(51) Int. Cl.
*B32B 27/12* (2006.01)
*B32B 27/32* (2006.01)
*D04H 3/16* (2006.01)

(52) U.S. Cl. .................. 442/394; 442/398; 442/401
(58) Field of Classification Search .................. 442/394, 442/398, 401
See application file for complete search history.

(56) References Cited

U.S. PATENT DOCUMENTS

| | | | |
|---|---|---|---|
| 3,988,519 A | 10/1976 | Stoller | |
| 4,853,602 A | 8/1989 | Hommes et al. | |
| 5,114,763 A | 5/1992 | Brant et al. | |
| 5,455,091 A * | 10/1995 | Oreglia et al. | 428/36.1 |
| 5,772,650 A | 6/1998 | Mizutani | |
| 5,785,699 A * | 7/1998 | Schmitz | 604/391 |
| 5,807,796 A | 9/1998 | Degrand et al. | |
| 5,885,721 A | 3/1999 | Su et al. | |
| 5,928,648 A | 7/1999 | Cochran | |
| 5,932,497 A | 8/1999 | Morman et al. | |
| 6,096,014 A | 8/2000 | Haffner et al. | 604/367 |
| 6,168,826 B1 | 1/2001 | Su et al. | |
| 6,187,696 B1 | 2/2001 | Lim et al. | |
| 6,190,758 B1 | 2/2001 | Stopper | 428/198 |
| 6,403,505 B1 | 6/2002 | Groitzsch et al. | |
| 6,610,163 B1 | 8/2003 | Mathis | |
| 6,677,258 B2 | 1/2004 | Carroll et al. | |
| 6,774,069 B2 | 8/2004 | Zhou et al. | |
| 6,809,048 B1 | 10/2004 | Jacobs | 442/401 |
| 6,818,704 B2 | 11/2004 | Brant | |
| 2004/0005834 A1 | 1/2004 | Zhou et al. | 442/328 |
| 2004/0192823 A1 | 9/2004 | Curry et al. | |

FOREIGN PATENT DOCUMENTS

EP 0 082 726 B1 4/1986
GB 2 285 408 7/1995

OTHER PUBLICATIONS

Hydrocarbon Resins, Kirk-Othmer, Encyclopedia of Chemical Technology, 4th Ed. v.13, pp. 717-743 (J. Wiley & Sons, 1995).

* cited by examiner

*Primary Examiner*—Lynda Salvatore

(57) ABSTRACT

Multiple layer structures incorporating at least one polymeric film layer and at least one nonwoven fabric layer and products produced from such structures are provided. The polymeric film layer includes at least one tackifier resin. The at least one tackifier resin may be selected from a variety of resins including synthetic and natural resins. In certain embodiments, the at least one tackifier resin may be present at a concentration of about 0.1 wt. % to about 50 wt. % of the polymeric layer. The polymeric film layer may include one or more polymeric components selected from a variety of polymeric materials. Exemplary polymeric materials include polyethylene and ethylene vinyl acetate although as discussed hereinafter, a wide range of polymeric joined with a nonwoven fabric. The multiple layer structures may include additional layers made from a variety of materials. The structures exhibit beneficial peel strength properties between the polymeric layer and the nonwoven fabric layer.

26 Claims, 4 Drawing Sheets

Figure 1:
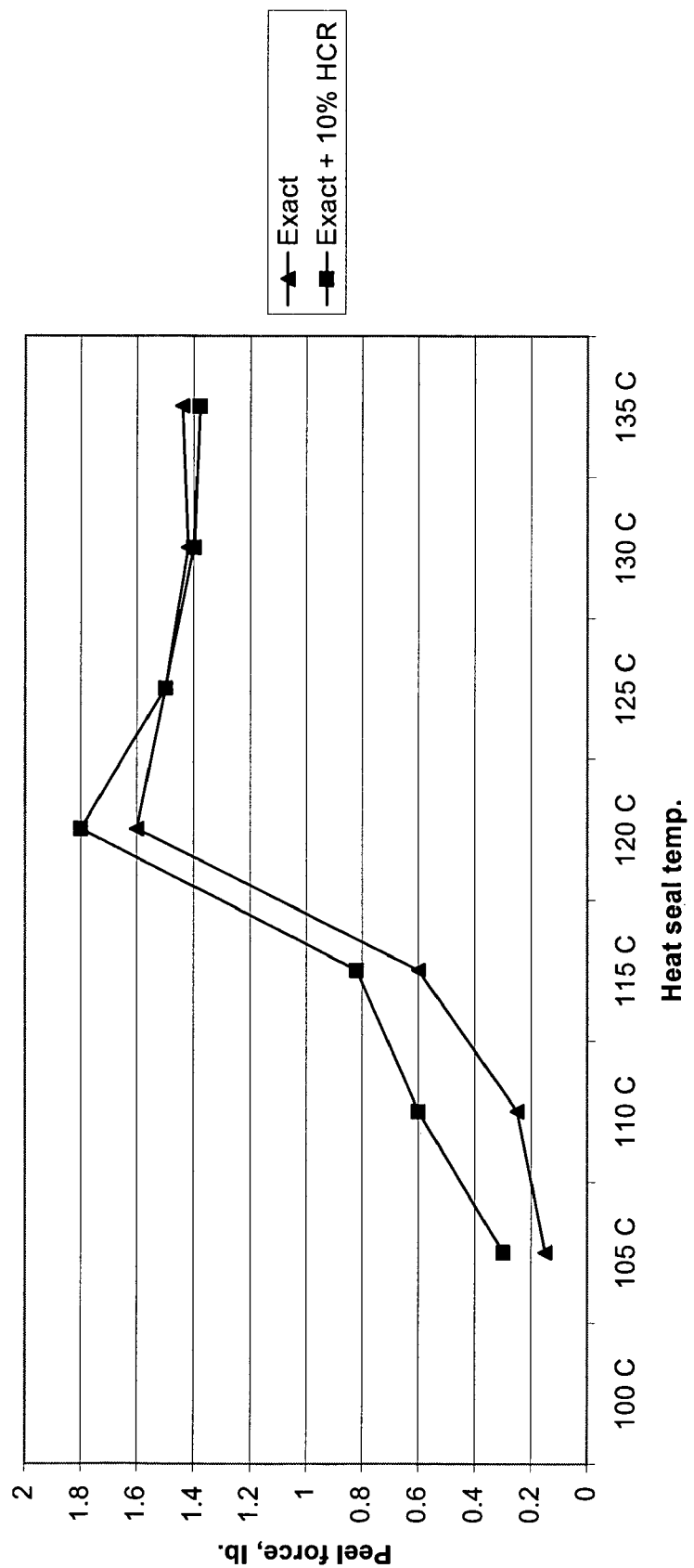

Comparison of Peel Force with 15 gsm PP SB fabric

MULTIPLE LAYER NONWOVEN FABRIC STRUCTURES

FIELD OF THE DISCLOSURE

This disclosure relates to multiple layer structures including at least one polymeric film layer and at least one nonwoven fabric layer and products produced using such structures.

BACKGROUND INFORMATION

Multiple layer structures including a polymer film layer and a nonwoven fabric layer are known in the art. Processes used to produce the structures from the film and nonwoven fabric layers include melt bonding the film layer and nonwoven fabric layer together using, for example, a bonding calendar system. Exemplary processes of this type are disclosed in U.S. Pat. No. 6,677,258 to Carroll et al.; U.S. Pat. No. 6,610,163 Mathis; U.S. Pat. No. 6,403,505 to Groitzsch et al.; U.S. Pat. No. 5,932,497 to Morman et al.; and U.S. Pat. No. 3,988,519 to Stoller. It is also known to use adhesive compositions applied to the nonwoven fabric layer which is then joined to the film layer using the adhesive. Exemplary processes of this type are disclosed in U.S. Pat. No. 6,774,069 to Zhou et al.; U.S. Pat. No. 6,187,696 to Lim et al.; U.S. Pat. No. 5,928,648 to Cochran; and U.S. Pat. No. 5,807,796 to Degrand et al.

It is known to use multiple layers structures of these types in a variety of end-use applications, including consumer products, hygiene products, and medical products. Exemplary products that may be produced from structures described herein include diapers, incontinence products, and feminine care products wherein the top layer consists of a spunbonded and/or melt blown nonwoven fabrics and the bottom layer consists of a polymeric film layer.

These multiple layer structures are desirable for use in production of many end-use products for a variety of reasons. For example, in protective apparel, such as patient gowns and surgical garments, the multiple layer structures help prevent cross exchange of microorganisms between the patients and medical staff. While this is true with respect to simple polymeric structures as well. The multiple layer structures are generally more aesthetically pleasing than simple polymeric structures. Many beneficial properties result from incorporation of the nonwoven fabric layer in the multiple layer structures. Specifically, the nonwoven fabric layers make it possible to produce products that more "cloth-like", both from a tactile and visual standpoint.

BRIEF DESCRIPTION OF THE DISCLOSURE

This disclosure relates to multiple layer structures incorporating at least one polymeric film layer adhered to at least one nonwoven fabric layer and products produced from such structures. The polymeric layer includes at least one tackifier resin. The polymeric layer may be provided by extrusion, coating, or other means. The at least one tackifier resin may be selected from a variety of resins including synthetic resins and natural resins. The at least one tackifier resin may be present at a concentration of about 0.1 wt. % to about 50 wt. % of the polymeric film layer. The polymeric film layer may include one or more polymeric material components selected from a variety of polymeric materials. Exemplary polymeric materials include polyethylenes, copolymers of ethylene and other olefin monomers, polypropylenes, and copolymers of propylene and other olefin monomers, and ethylene vinyl acetates. The multiple layer structures may include additional layers made from a variety of other materials.

The polymeric film layer and the nonwoven fabric layer may be adhered to each other by a variety of methods including calendaring, extrusion coating the polymeric layer onto the nonwoven fabric layer, coating the polymeric layer by gravure coating, roll coating, spraying, etc., by applying an adhesive onto the polymeric layer and then bonding to the nonwoven fabric layer by pressure or pressure and heat. Once adhered to each other, the polymeric layer and nonwoven layer exhibit beneficial peel strength properties. These beneficial peel strength properties provide multiple layer structures exhibiting a reduced tendency to delaminate during use.

The multiple layer structures descried herein may be used in the production of a variety of products including consumer products, hygiene products, and medical garment products. Exemplary products that may be produced from the multiple layer structures are diapers, incontinence products, feminine care products, patient gowns, and surgical garments.

BRIEF DEDSCRIPTION OF THE DRAWINGS

FIG. 1 reports data and provides a graphical depiction of peel strength as a function of temperature of a plastomer/lightweight fabric multiple layer structure as described herein and a comparative plastomer/lightweight fabric multiple layer structure.

Figure 2:
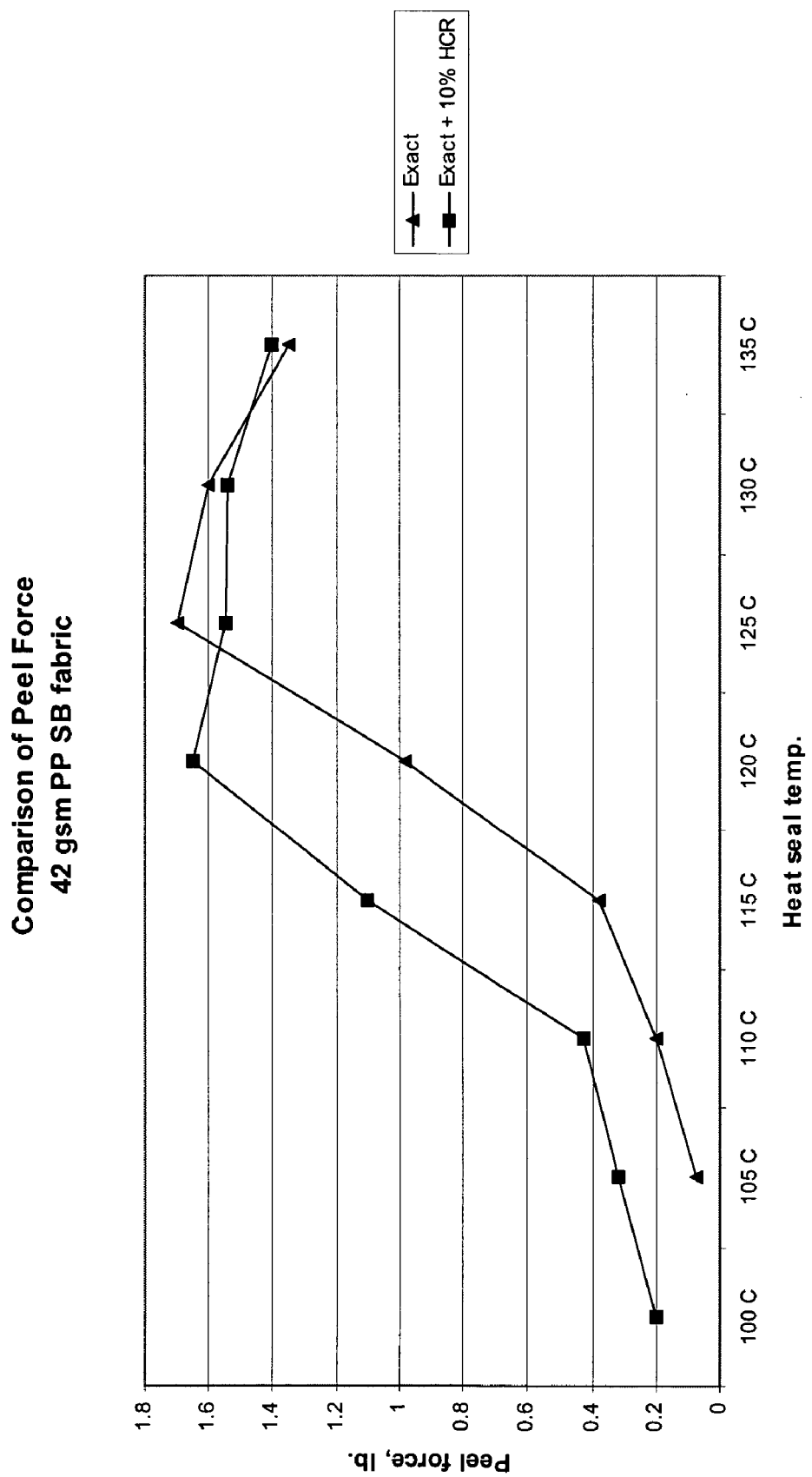

FIG. 2 reports data and provides a graphical depiction of peel strength as a function of temperature of a plastomer/heavyweight fabric multiple layer structure as described herein and a comparative plastomer/heavyweight fabric multiple layer structure.

Figure 3:
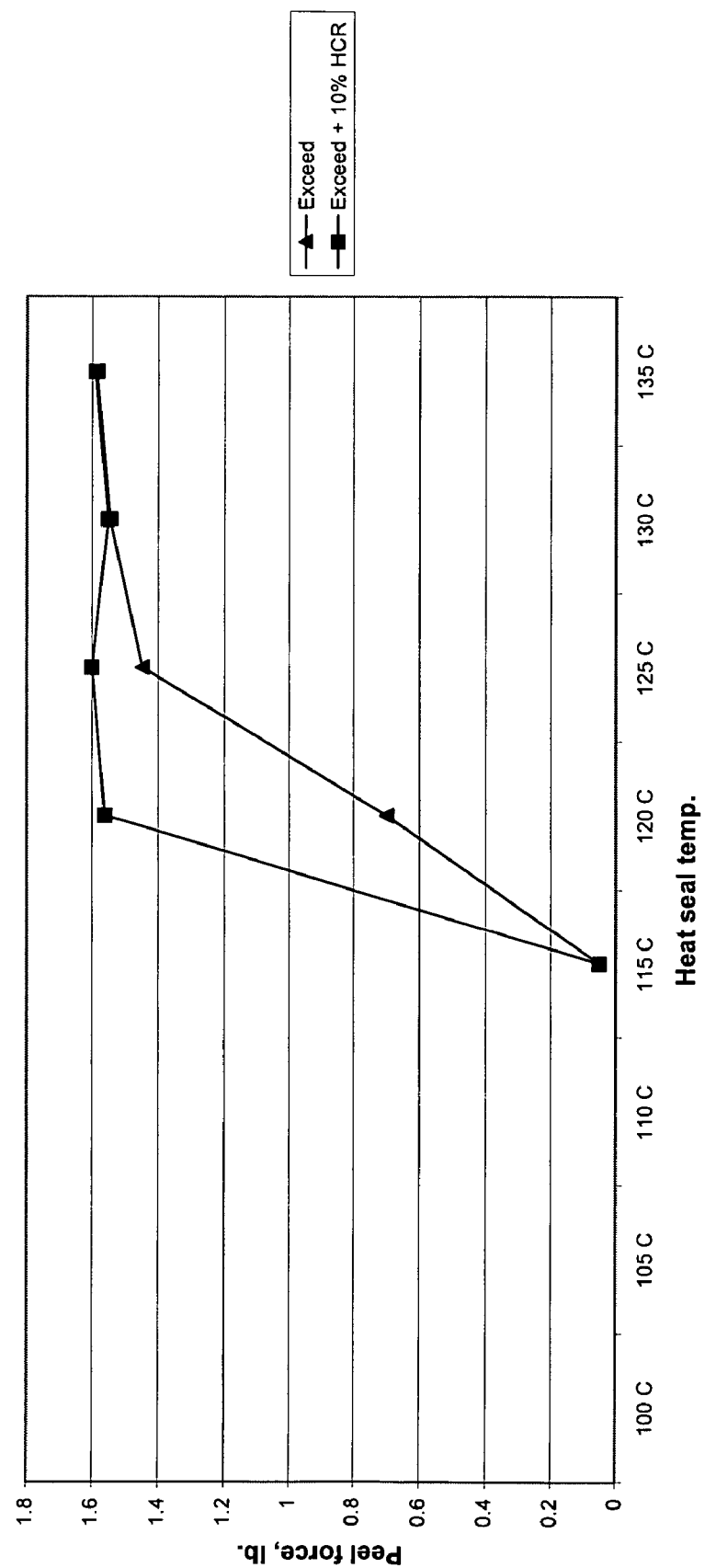

FIG. 3 reports data and provides a graphical depiction of peel strength as a function of temperature of a low density polyethylene/heavyweight fabric multiple layer structure as described herein and a comparative low density polyethylene/heavyweight fabric multiple layer structure.

Figure 4:
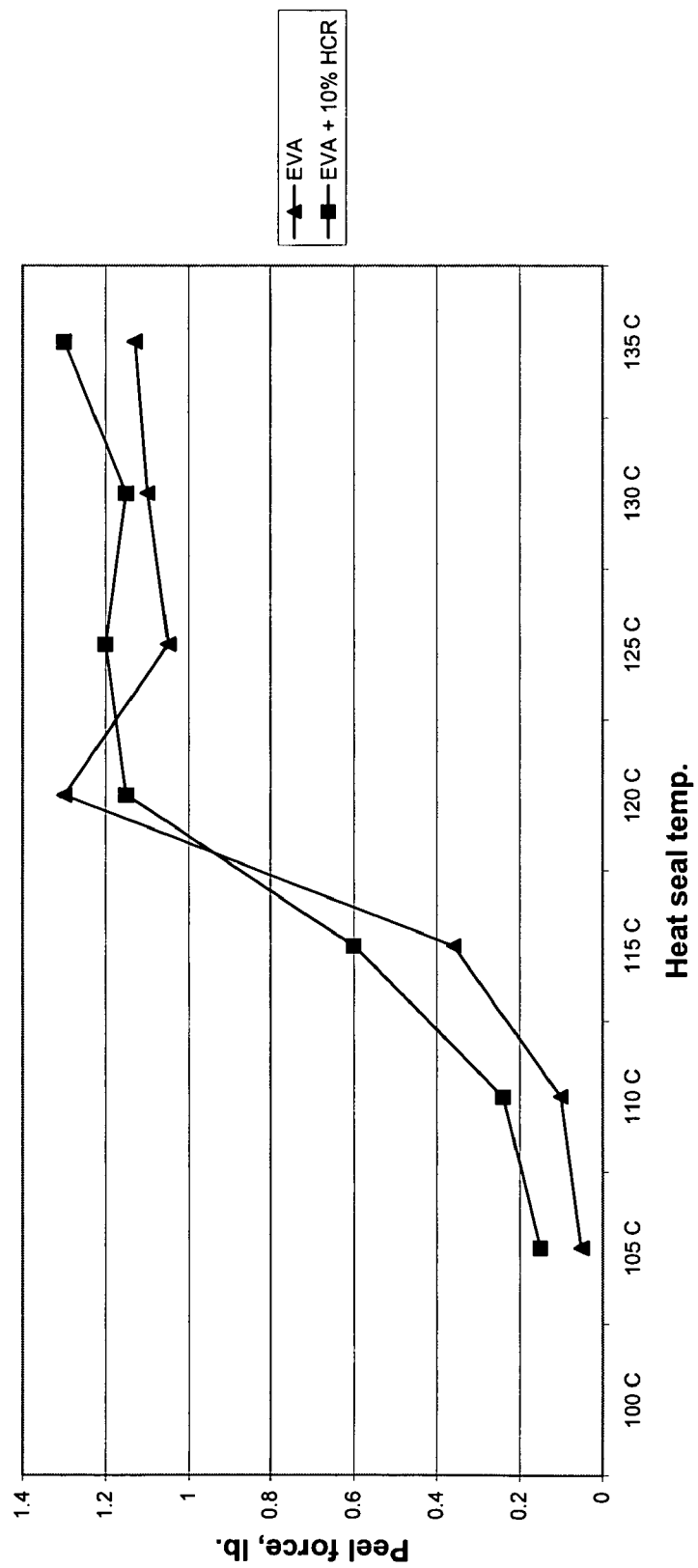

FIG. 4 reports data and provides a graphical depiction of peel strength as a function of temperature of an EVA/heavyweight fabric multiple layer structure as described herein and a comparative EVA/heavyweight fabric multiple layer structure.

DETAILED DISCLOSURE

This disclosure relates to multiple layer structures incorporating a polymeric film joined to a nonwoven fabric layer and products produced using such multiple layer structures. The multiple layer structures exhibit beneficial performance properties making them useful for producing a variety of products. As discussed above, products produced from multiple layer structures including a polymeric layer and a nonwoven fabric layer exhibit a variety of beneficial performance characteristics. However, a significant shortcoming of such multiple layer structures is that the different layers may delaminate because of low peel strengths between the layers. The low peel strengths render the structures unsuitable for many uses.

The multiple layer structures described herein exhibit enhanced peel strength between the polymeric film layer and the nonwoven fabric layer in comparison to conventional polymeric/fabric multiple layer structures.

The polymeric materials suitable for inclusion in the polymeric film layers of the multiple layer structures described herein include at least one polymer selected from a wide variety of polymers. At least one tackifier resin, selected from a wide variety of tackifier resins, is also included in the polymeric film layers of the multiple layer structures described herein.

In certain embodiments, the polymeric layer of the multiple layer structures described herein incorporate from about 20 wt. % to about 99 wt. % of the selected polymeric material. In other embodiments, the polymeric film layer of the multiple layer structures described herein incorporate from about 30 wt. % to about 95 wt. % of the selected polymeric material. In still other embodiments, the polymeric film layer of the multiple layer structures described herein incorporate from about 40 wt. % to about 90 wt. % of the selected polymeric material.

Exemplary polymeric materials suitable for inclusion in the polymeric film layer are thermoplastic materials such as polyolefins such as polypropylene, polyethylene, polybutene, polystyrene, polyvinyl chloride, ethylene containing copolymers such as ethylene-propylene copolymers, propylene-containing copolymers and terpolymers, ethylene containing terpolymers such as ethylene-butylene-propylene terpolymers, and combinations thereof.

Other exemplary polymeric materials suitable for inclusion in the polymeric film layer are polyethylene terephthalate, other polyesters, including but not limited to, polyethylene terephthalate glycol [PETG], polyethylene naphthalate [PEN], liquid crystalline polymers [LCP], nylon, including oriented nylon, ethylene-vinyl acetate copolymers, thermoplastic polyurethanes, ethylene-vinyl alcohol copolymers, elastomeric polymers, and combinations thereof.

Certain specific polymeric materials suitable for inclusion in the polymeric film layer are a low density polyethylene designated LD 151; EVA's designated FL 218, FL 728, and LD 306; metallocene polyethylenes designated EXCEED 1018CA and EXCEED 1327CA; plastomer grades designated EXACT 0201H, 8203; and a polypropylene homopolymer designated PP 4772; all of these polymers are commercially available from ExxonMobil Chemical.

In certain embodiments, the polymeric film layer includes at least one polyethylene material having a density of from about 0.86 g/cm$^3$ to about 0.95 g/cm$^3$. This density range encompasses materials ranging from plastomers to high density polyethylene. The polyethylene materials may be produced from different catalyst systems, including metallocene and Ziegler-Natta catalyst systems. The polyethylene materials may be linear, branched and may be copolymers such as ethylene vinyl acetate ("EVA"), ethylene acrylic acid ("EAA") and ethylene meth-acrylic acid ("EMA").

Blends of any of the foregoing polymers are also contemplated for use as the polymer incorporated into the polymeric layer of the multiple layer structures described herein.

In certain embodiments, the polymeric film layer of the multiple layer structures described herein incorporate from about 0.1 wt. % to about 50 wt. % of the selected tackifier resin. In other embodiments, the polymeric film layer of the multiple layer structures described herein incorporate from about 1 wt. % to about 30 wt. % of the selected tackifier resin. In still other embodiments, the polymeric film layer incorporates from about 5 wt. % to about 20 wt. % of the selected tackifier resin. In still other embodiments, the polymeric film layer incorporates from about 5 wt. % to about 10 wt. % of the selected tackifier resin.

Tackifier resins suitable for inclusion in the polymeric layer of the multiple layer structures described herein include hydrocarbon resins, synthetic polyterpenes, resin esters and natural terpenes, and combinations thereof. In certain embodiments, the tackifier resins soften or become liquid at temperatures of about 40° C. to about 150° C. In certain embodiments, the tackifier resins have number average molecular weights, as measured by vapor phase osmometry, below that of the polymeric material included in the polymeric film layer. In certain embodiments, the number average molecular weights of the tackifier resins are less than about 5,000. In other embodiments, the number average molecular weights of the tackifier resins are less than about 1,000. In additional embodiments, the number average molecular weights of the tackifier resins are from about 500 to about 1000.

In certain embodiments, the tackifier resins have ring and ball softening point of about 20° C. to about 160° C. In additional embodiments, tackifier resins have ring and ball softening points of about 40° C. to about 160° C. In still other embodiments, tackifier resins have ring and ball softening points of about 50° C. to about 160° C.

Various types of natural and synthetic resins, alone or in admixture with each other, may be used be selected as the tackifier resin. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes filly, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin. For additional description of tackifier resins, reference can be made to technical literature, e.g., Hydrocarbon Resins, Kirk-Othmer, Encyclopedia of Chemical Technology, 4th Ed. v. 13, pp. 717-743 (J. Wiley & Sons, 1995).

Hydrogenated petroleum resins are usually prepared by catalytically hydrogenating a thermally polymerized steam cracked petroleum distillate fraction, especially a fraction having a boiling point of between 20° C. and 280° C. These fractions usually are of compounds having one or more unsaturated cyclic rings in the molecule, such as cyclodienes, cycloalkenes, and indenes. It is also possible to hydrogenate resins produced by the catalytic polymerization of unsaturated hydrocarbons. Before hydrogenation occurs the polymerized resin is usually dissolved in a saturated hydrocarbon solvent such as heptane. The hydrogenation catalysts that may be used include nickel, reduced nickel, or molybdenum sulphide. Hydrogenation may take place in a single stage at a temperature of 200° C. to 330° C., at a pressure of about 2 MPa to 15 MPa for a period of 5 to 7 hours. After filtering off the catalyst, the solvent is removed by distillation and recovered for recycling. An improved hydrogenation process leading to increased yields of high quality hydrogenated hydrocarbon resins is described in EP 0 082 726 to Bossaert et al.

Exemplary tackifier resins suitable for use as described herein include EMPR™ 100, 101, 102, 103, 104,105, 106, 107, 108, 109, 110, 116, 117, and 118 resins, OPPERA™ resins, and EMFR resins available form ExxonMobil Chemical; ARKON™ P140, P125, P115, M115, and M135 and SUPER ESTER™ rosin esters available from Arakawa Chemical Company of Japan; SYLVARES™ polyterpene resins, styrenated terpene resins and terpene phenolic resins and SYLVATAC™ and SYLVALITE™ rosin esters available from Arizona Chemical Company; NORSOLENE™ aliphatic aromatic resins available from Cray Valley of France; DERTOPHENE™ terpene phenolic resins and DERCOLYTE™ polyterpene resins available from DRT Chemical Company of France; EASTOTAC™ resins, PICCOTAC™ resins, REGALITE™ and REGALREZ™ hydrogenated cycloaliphatic/aromatic resins available from Eastman Chemical Company of Kingsport, Tenn.; WINGTACK™ resins available from Goodyear Chemical Company, PICCOLYTE™; PERMALYN™ polyterpene resins, rosins and rosin esters available from Eastman Chemical Company; coumerone/indene resins available from Neville Chemical Company; QUINTONE™ acid modified $C_5$ resins, $C_5/C_9$ resins, and acid modified $C_5/C_9$ resins available from Nippon Zeon of Japan; and CLEARON™ hydrogenated terpene resins available from Yasuhara. The preceding examples are illustrative only and by no means limiting.

Specific tackifier resins include any E-5000 series hydrocarbon resin commercially available from ExxonMobil Chemical; any functionalized hydrocarbon resin such as EMFR-100 manufactured by ExxonMobil Chemical; and Oppera PR 104N or 113N manufactured by ExxonMobil Chemical.

In certain embodiments, the tackifier resin is functionalized to promote compatibility with the polymeric material of the polymeric layer. Promoting compatibility may be particularly important when a polar polymeric material is used in the polymeric layer of the multiple layer structures described herein. Exemplary polar polymeric materials include polyesters and polyurethanes. Functionalization may be accomplished by maleic anhydride in a twin screw reaction extrusion.

Combinations of any of the foregoing tackifier resins are also contemplated for use as the tackifier incorporated into the polymeric film layer of the multiple layer structures described herein.

In certain embodiments, the tackifier resin should be uniformly dispersed within the polymeric film layer. Most tackifier resins are irregular in shape and size which makes it difficult to accurately meter a tackifier resin into an extruder. The low melting point of the tackifier also makes it prone to premature melt in the extruder hopper, making it difficult to feed the polymer and the tackifier into the screw and affect the feeding accuracy. To promote uniform distribution of the tackifier resin and accurate proportions of the polymeric material and the tackifier resin, it is found that masterbatch compositions of the tackifier resin and the polymer material are useful.

In certain embodiments, the masterbatch of the tackifier resin may have include about 5 wt. % to about 80 wt. % of the tackifier resin. In other embodiments, the masterbatch may include about 20 wt. % to about 60 wt. % of the tackifier resin. The balance of the masterbatch in these embodiments may be derived from the polymeric material used in the polymeric film layer.

The masterbatch is then used in the film extrusion or coating extruder by feeding the appropriate ratio of the masterbatch and the polymeric material selected. For example, in certain embodiments, if the masterbatch composition includes 50 wt. % of the tackifier resin, a combination of 10 wt. % of the masterbatch and 90 wt. % of the polymeric material will provide a polymeric film containing 5 wt. % of the tackifier. By adjusting the ratio of the masterbatch and the polymeric material, different concentration levels of the tackifier resin in the polymeric film layer may be achieved. The masterbatch material may be preblended with the polymeric resin and then fed into the extruder hopper, or the masterbatch material and the polymeric material may be fed into the extruder as separate feeds, making it easier to adjust the content of the tackier in the polymeric film layer.

In certain embodiments, the polymeric material and the tackifier resin are weighed for the desired proportions and loaded into the mixers such as drum tumblers, cement mixers or any low intensity mixing devices designed to blend the solid particulated materials. After the blend has reached a uniform stage, the mixture is loaded into the hopper or feeder of compounding equipment. The compounding equipment may include a single screw extruder, a twin screw extruder, or any other melt blending equipment such as a Banbury, a FCM ("Farrel Continuous Mixer"), etc. that are commonly used in the compounding industry.

The polymeric film layer incorporating the tackifier resin may include processing aids or inorganic particulates such as titanium dioxide or void initiating agents to enhance the whiteness or color of the substrate or to enhance antiblocking properties. Exemplary void initiators and techniques are disclosed in U.S. Pat. No. 5,885,721 to Su et al. and U.S. Pat. No. 6,168,826 to Su et al. Exemplary additional additives are slip, antiblock, and antistatic agents that are well known in the art and used to improve substrate functionality and properties. Additionally, as mentioned previously, the substrate may be metallized.

In certain embodiments, the polymeric film layers of the multiple layer structures described herein have thicknesses of about 5 μm to about 80 μm. In other embodiments, the polymeric film layers of the multiple layer structures described herein have thicknesses of about 20 μm to about 40 μm. In still other embodiments, the polymeric film layers of the multiple layer structures described herein have thicknesses of about 25 μm to about 30 μm.

The polymeric film layer of the multiple layer structures described herein may be produced by a variety of methods. For example, the polymeric film layer may be produced by simple extrusion techniques and other relatively simple polymeric film layer production techniques. In other embodiments, the polymeric film layer may be produced by more complex extrusion and orientation methods. Suitable polymeric film layers include oriented and hot-blown films made from any of a number of processes. The oriented polymeric film layers may be manufactured in a variety of processes including biaxial orientation, machine direction orientation (MDO), double bubble, simultaneous longitudinal and transverse orientation (LISIM®), tape bubble, trapped bubble or tenter framing. The use of linear motors to directly propel tenter clips to effect simultaneous longitudinal and transverse orientation is disclosed in U.S. Pat. No. 4,853,602 to Hommes et al.

The polymeric film layer may also be produced by blown film and extrusion coating processes. In blown film processes, molten polymeric material is extruded through an annular die. The molten polymer I shaped in a tubular bubble form inflated by the air trapped in the bubble. The inflation increases the bubble diameter and thereby reduces the film thickness and also oriented the polymer in the cross direction. The film thickness is also controlled by the haul-off speed of the winder. In cast film process, the molten polymer is deposited onto a rotating chill roll. The polymer is quenched on the chill roll and forms a film. The thickness of the film is controlled by the speed of the rotating chilled roll and the take up speed.

In extrusion coating processes, molten polymeric material from a die is deposited onto the substrate such as nonwoven fabric. The hot polymer film and the substrate is pressed between a nip formed by two rolls. The rolls may be chilled and one of the roll may be metal or rubber roll. The pressure and the cooling serve to bond the film to the substrate.

In certain embodiments, the polymeric film layer is a coating. In such embodiments, the polymeric film layer may be applied to the nonwoven fabric layer by applying the polymeric material as a coating dissolved in a solvent. Such coatings may be applied by process techniques such as gravure coating, roll coating, spraying, etc. The coating composition should generally be applied in such amounts that there will be deposited a smooth, evenly distributed layer on the surface of the nonwoven fabric layer. In certain embodiments, the coating composition is applied at a concentration sufficient to provide a layer of about 10 $g/m^2$ to about 100 $g/m^2$ of the polymeric material on the nonwoven fabric layer. In other embodiments, the coating composition is applied at a concentration sufficient to provide a layer of about 10 $g/m^2$ to about 50 $g/m^2$ of the polymeric material on the nonwoven fabric layer. In additional embodiments, the coating composition is applied at a thickness sufficient to provide a layer of about 15 $g/m^2$ to about 40 $g/m^2$ of the polymeric material on the nonwoven fabric layer. In still other embodiments, the coating composition is applied at a thickness sufficient to provide a coating layer of about 20 $g/m^2$ to about 30 $g/m^2$ of the polymeric material on the nonwoven fabric layer.

The method selected to produce the polymeric layer is, of course, determined by the desired properties in the layers and the availability of different production techniques available, the manner in which the polymeric film layer is to be joined to the nonwoven fabric layer, and costs.

The nonwoven fabric layer of the multiple layer structures described herein may incorporate a wide variety of nonwoven fabric materials. The nonwoven fabric layer may be a multiple layer structure. Such structures may include any combination of spunbond bond layers, melt blown layer and film layers made from various polymers. For example, the nonwoven fabric layer may be polypropylene spunbond or polypropylene spun bond/melt blown/spunbond composite fabric.

In certain embodiments, the nonwoven fabric layer of the multiple layer structures described herein incorporate from about 10 wt. % to about 95 wt. % of the selected nonwoven fabric. In other embodiments, the nonwoven fabric layer of the multiple layer structures described herein incorporate from about 30 wt. % to about 60 wt. % of the nonwoven fabric. In still other embodiments, the nonwoven fabric layer of the multiple layer structures described herein incorporate from about 40 wt. % to about 50 wt. % of the selected nonwoven fabric.

Suitable nonwoven fabrics include spunbond webs, melt blown webs, scrims, carded webs, flashspun webs, and nonwoven sheets comprised of blends of polyolefin fibers, other fibers, or of polyolefin fibers and other fibers. The nonwoven fabric layer may be composite fabric made up of any combination of various nonwoven fabrics such as spunbond/melt blown/spunbond fabrics. In certain embodiments, webs of polyolefin fibers or other synthetic fibers can be used as they provide a variety of desirable properties, including good air permeability, flexibility, softness and strength.

The fibers used to produce the nonwoven fabric layer may be made in any suitable process, including by spinning, including melt and solution spinning (including spunbonding), melt blowing, film slitting and film fibrillating. Spunbond processes are widely used to produce nonwoven fabrics. The spunbond nonwoven fabric may include fibers having dimensions of about 10 μm to about 30 μm and the weight of the fabric in the range of about 10 $g/m^2$ to several hundred $g/m^2$. Melt blown processes also used to produce nonwoven fabrics with fiber diameters ranging from less than 1 μm to approximately 10 μm. The basis weight of the melt blown fabric may be as low as a few grams if the melt blown fibers are deposited on top of a spunbond fabric to several hundred grams for such application as wipes and sorbent products. The nonwoven fabric may also be produced by a combination of spunbond and melt blown processes to make spunbond/melt blown/spunbond composite fabrics in-line. Conventional fiber spinning is used to produce staple fibers which are then carded and thermally bonded to produce nonwoven fabrics. Solution spinning, flush spinning, and other fiber producing processes may also be used to produce nonwoven fabrics for use in the nonwoven fabric layer of the structures described herein.

The fibers used to produce the nonwoven fabric may be produced from a variety of polymeric materials. Exemplary suitable polymeric materials used to produce the nonwoven fabrics include propylene homopolymers and copolymers, polyester homopolymers and copolymers, nylon resins, and ethylene homopolymers and copolymers. The nonwoven fabric material may be single or multiple component materials. For example, the nonwoven fabric may also bi-component nonwovens. Exemplary bi-component nonwovens are layers including a polypropylene core layer combined with a polyethylene sheath layer or polyethylene terephthalate ("PET") core layer adhered to the polyethylene or polypropylene sheath layer. Polyethylene layers are frequently used in nonwoven fabrics to provide softer feel.

In exemplary embodiments, the fibers used in production of the nonwoven fabric layer are produced from a 36 MFR polypropylene homopolymer commercially available from ExxonMobil under the designation PP3155.

In certain embodiments, the nonwoven fabric layer may have a density and thickness such that the nonwoven fabric layer has a weight of about 10 $g/m^2$ to about 500 $g/m^2$. In other embodiments, the nonwoven fabric layer may have a density and thickness such that the nonwoven fabric layer has a weight of about 15 $g/m^2$ to about 100 $g/m^2$. In additional embodiments, the nonwoven fabric layer may have a density and thickness such that the nonwoven fabric layer has a weight of about 20 $g/m^2$ to about 60 $g/m^2$.

As discussed above, the multiple layer structures are produced by joining the polymeric film layer and the nonwoven fabric layer. In one embodiment, the polymeric film layer and the nonwoven fabric layer are joined by a calendaring process. In a calendaring process, the film and the nonwoven are fed into a nip formed by a heated metal roll and a pressure roll such as a rubber roll. The pressure and the heat caused the film and the nonwoven to bond and form a composite web. The temperature, the pressure and the line speed affect the bonding properties of the two webs. However, the properties of polymeric layer and the nonwoven layer also significantly affect the bonding characteristic of the two materials. In other embodiments, the polymeric film layer and the nonwoven fabric layer may be joined together by extrusion coating the polymeric film layer onto the nonwoven fabric layer. In the extrusion coating process, a curtain of molten polymer is deposited onto the nonwoven fabric layer. The nonwoven fabric may be produces in-line (such as in a spunbond line) or unwound from a roll of the finished nonwoven fabric. After the molten polymer material is deposited on the nonwoven fabric, the composite passes through a nip formed by the metal roll and a rubber roll. The pressure applied causes the molten polymer to adhere to the nonwoven fabric and prevent delamination.

The film and the nonwoven fabric may be joined by other methods such as ultrasonic bonding, adhesive bonding, and combinations thereof.

Additional layers may be provided in multiple layer structures incorporating the polymeric layer and the nonwoven fabric layer. The additional layers may be additional nonwoven layers and/or polymeric layers. For example, additional layers may be provided to enhance barrier properties of the multiple layer structures. Additional layers may also be used to provide different colors to the multiple layer structures or change other optical properties of the structures.

In certain embodiments, the multiple layer structures incorporate from about 0.1 wt. % to about 50 wt. % of the polymeric layer and about 50 wt. % to about 99.9 wt. % of the nonwoven fabric layer. In other embodiments, the multiple layer structure incorporate from about 5 wt. % to about 50 wt. % of the polymeric layer and about 50 wt. % to about 95 wt. % of the nonwoven fabric layer. In additional embodiments, the multiple layer structure incorporate from about 10 wt. % to about 50 wt. % of the polymeric layer and about 50 wt. % to about 90 wt. % of the nonwoven fabric layer.

Experimental Evaluations

In each of the following examples, multiple layer structures, as described herein, were produced. The multiple layer structures included a polymeric layer and a nonwoven fabric layer. The polymeric layer of each structure included a tackifier resin as described. In each Example a comparative multiple layer structure a comparative polymeric layer that did not contain a tackifier resin was produced. In each structure produced, a first surface of the polymeric layer (Layer B) was laminated with the nonwoven fabric layer using a heat seal bar to simulate a calendaring process. Additionally, in each structure produced the polymeric film layer (Layer B) was coextruded with a second film layer (Layer A) such that the second film layer (Layer A) was bonded to the second surface of the polymeric film layer (Layer B). The peel strength of between the polymeric film layer (Layer B) and the nonwoven fabric layer in each structure was determined over a temperature range.

In all examples, a two layer film structure having a thickness of 30 μm (1.2 mil) was produced by a coextrusion blown film process to produce a film layer (Layer A) and a polymeric film layer as described herein (Layer B). Layer A produced by the main extruder provided 75% of the two layer film structure thickness. The polymer material of Layer A was a 1 MI, 0.918 g/cm$^3$ density polyethylene commercially available from ExxonMobil Chemical under the designation Exceed 1018CA. Layer B was produced by a satellite extruder and provided of 25% of the tow layer film structure thickness. The compositions of Layer B are as indicated in the Examples below. The surface of Layer B opposite Layer A was bonded with a spunbond nonwoven fabric layer. In the structures in which Layer B is a combination of a polymeric material and a tackifier resin, both components were preblended and compounded in a single screw extruder and pelletized before feeding to the satellite extruder.

The spunbond nonwoven fabric layer was produced in a spunbond line located at the Textile and Nonwoven Development Center located at the University of Tennessee. The spunbond line was manufactured by Reifenhauser GmbH & Co. of Troisdorf, Germany. The spunbond fabric was produced from a polypropylene homopolymer commercially available under the designation PP 3155 from ExxonMobil Chemical. The spunbond layer had a thickness and density corresponding to 15 g/m$^2$. A heavier basis weight fabric of 42 g/m$^2$ was also used in certain of the following Examples, as indicated.

The layers of the spunbond nonwoven fabric layer and Layer B were bonded to each other using a heated heat seal bar 0.953 cm wide and 12.7 cm long, with a temperature range of 105° C. to 135° C. The heat seal bar created a strip of bonded area approximately 0.953 cm wide and 12.7 cm in length. The heat sealer was manufactured by Theller Heat Sealing System, Model PC. To test the bonding strength, a strip of 2.5 cm in width and 10.16 cm in length was cut from the bonded fabric sample with the length direction perpendicular to the 12.7 cm bonding bar dimension. Therefore, the bonding area is only in the middle of the test strip. To test the bonding strength or the peel force, the test strip is mounted on the tensile tester. The polymeric film layer was attached to one jaw and the unbonded surface of the spunbond nonwoven fabric layer was attached to the other jaw. The force to separate the polymeric film layer and the nonwoven fabric layer was recorded as the peel force.

EXAMPLE 1

In this Example, Layer B included 90 wt. % of an ethylene plastomer having a melt index of 1 and a density of 0.902 g/cm$^3$ and commercially available from ExxonMobil Chemical under the designation Exact 0201HS. Layer B also included 10 wt. % of a maleic anhydride functionalized hydrocarbon resin. During the bonding experiment, Layer B was in contact with the spunbond fabric. A comparative multiple layer structure was produced in the same manner except that the polymeric Layer B contained only the Exact 0201HS ethylene plastomer. The bonding strength or peel strength of the fabric and the polymeric film layer was determined in the manner described above. FIG. 1 reports the peel strengths of both structures over the temperature range used during the bonding experiment.

EXAMPLE 2

In this Example, a multiple layer structure, as described herein, and a comparative multiple layer structure were produced as in Example 1 except that the nonwoven fabric spunbond layer in each structure had a different basis weight than the nonwoven fabric layer of the structures of Example 1. In this Example, the nonwoven fabric layers had a thicknesses and densities corresponding to 42 g/m$^2$. The bonding strength or peel strength of the fabric and the polymeric film layer was determined in the manner described above. FIG. 2 reports the peel strengths of both structures over a temperature range of 105° C. to 135° C.

EXAMPLE 3

In this Example, Layer A was the same as Layer A in Example 1. Layer B included 90 wt. % of a low density metallocene catalyzed polyethylene having a density of 0.918 g/cm$^3$ and a melt index of 1 and commercially available from ExxonMobil Chemical under the designation Exceed 1018 CA. Layer B also included 10 wt. % of a maleic anhydride functionalized hydrocarbon resin. A comparative multiple layer structure was produced in the same manner except that Layer B contained only the Exceed 1018 CA low density metallocene catalyzed polyethylene. The bonding strength or peel strength of the fabric and the polymer film layer was determined in the manner described above. FIG. 3 reports the peel strengths of both structures over the temperature range.

EXAMPLE 4

In this Example, Layer A of the polymeric film layer was the same as Layer A in Example 1. Layer B included 90 wt. % of an EVA polymer having a melt index of 2 and 5% VA commercially available from ExxonMobil Chemical Company under the designation LD306.38. Layer B also included 10 wt. % of a maleic anhydride functionalized hydrocarbon resin. The nonwoven fabric spunbond layer had a thickness and density corresponding to 42 g/m$^2$. A comparative multiple layer structure was produced in the same manner except that layer B contained only the LD306.38. The bonding strength or peel strength of the fabric and the polymer film layer was determined in the manner described above. FIG. 4 reports the peel strengths of both structures over the temperature range.

It is seen that the addition of the tackifier resin to a polymeric layer significantly improves the peel strength of the multiple layer structures incorporating a polymeric layer film and a nonwoven fabric layer. It is also noted during testing that the film with 10 wt. % hydrocarbon resin shows a bonding initiation at a lower temperature. This can be demonstrated by comparing the bonding temperature under constant peel force. The results show that the same peel force may be obtained at a lower bonding temperature when Layer B contains 10% of hydrocarbon resin. The ability to bond at lower temperatures is advantageous in many processes used to produce the multiple layer structures described herein. For example, in extrusion coating processes, the contact time between the polymeric layer and the nonwoven fabric layer is very brief in the nip, bonding at lower temperatures allows process to run at a higher line speed and increase the production rate. Additionally, some substrates may not be able withstand a high temperature and therefore lower bonding temperatures allow for production of multiple layer structures as described herein to be produced with a wider variety of materials as compared to conventional multiple layer structures.

With respect to the various ranges set forth herein, any upper limit recited may, of course, be combined with any lower limit for selected sub-ranges.

All patents and publications, including priority documents and testing procedures, referred to herein are hereby incorporated by reference in their entireties.

Although the present invention and its advantages have been described in detail, it should be understood that various changes, substitutions, and alterations could be made without departing from the spirit and scope of the invention as defined by the following claims.

What is claimed is:

1. A multiple layer structure comprising:
    (i) a first polymeric film coating layer having a first surface, second surface, and layer thickness of about 15 g/m$^2$ to about 40 g/m$^2$, the layer consisting essentially of:
        from about 20 wt. % to about 99 wt. % of a polymeric material selected from the group consisting of polyethylene, polypropylene, ethylene copolymers, propylene copolymers, polyurethanes, polyesters, nylons, and combinations thereof, and
        from about 5 wt. % to about 10 wt. % of a tackifier resin having a ring and ball softening point of about 20° C. to about 160° C., based on the weight of the multiple layer structure;
    (ii) a nonwoven fabric layer comprising from about 10 wt. % to 95 wt. % of a nonwoven fabric, based on the weight of the multiple layer structure, and
    (iii) at least one additional polymeric film layer comprising the same polymeric species as the first polymeric film layer, the at least one additional polymeric film layer not including a tackifier resin, wherein the nonwoven fabric layer is joined to the first surface of the first polymeric film layer and the at least one additional polymeric film layer is joined to the second surface of the first polymeric film layer.

2. The multiple layer structure of claim 1, wherein the polymeric material is selected from the group consisting of polyethylene, polypropylene, ethylene copolymers, propylene copolymers, and combinations thereof.

3. The multiple layer structure of claim 2, wherein the nonwoven fabric is comprised of material selected from the group consisting of polyethylenes, polypropylenes, polyurethanes, polyesters, nylons, and combinations thereof.

4. The multiple layer structure of claim 1, wherein the tackifier resin is a hydrocarbon resin.

5. The multiple layer structure of claim 1, wherein the first polymeric film layer comprises about 30 wt. % to about 95 wt. % of the polymeric material.

6. The multiple layer structure of claim 5, wherein the nonwoven fabric layer comprises a spunbond fabric consisting essentially of polypropylenes, polyethylene, polyesters, and combinations thereof.

7. The multiple layer structure of claim 1, wherein the nonwoven fabric layer has a weight of about 10 g/m$^2$ to about 500 g/m$^2$.

8. A process for producing a multiple layer structure comprising
    (i) providing a first polymeric film coating layer having a first surface, second surface, and layer thickness of about 15 g/m$^2$ to about 40 g/m$^2$, the layer consisting essentially of:
        from about 20 wt. % to about 99 wt. % of a polymeric material selected from the group consisting of polyethylene, polypropylene, ethylene copolymers, propylene copolymers, polyurethanes, polyesters, nylons, and combinations thereof, and
        from about 5 wt. % to about 10 wt. % of a tackifier resin having a ring and ball softening point of about 20° C. to about 160° C., based on the weight of the multiple layer structure;
    (ii) joining the first surface of the first polymeric film to a nonwoven fabric layer comprising from about 10 wt. % to 95 wt. % of a nonwoven fabric based on the weight of the multiple layer structure, and
    (iii) joining the second surface of the second polymeric film to at least one additional polymeric film layer comprising the same polymeric species as the first polymeric film layer, the at least one additional polymeric film layer not including a tackifier resin.

9. The process of claim 8, wherein the polymeric material is selected from the group consisting of polyethylenes, polypropylenes, polyurethanes, polyesters, nylons, elastomeric polymers, and combinations thereof.

10. The process of claim 9, wherein the tackifier resin has a ring and ball softening point of about 20° C. to about 160° C.

11. The process of claim 10, wherein the nonwoven fabric is comprised of material selected from the group consisting of polyethylenes, polypropylenes, polyurethanes, polyesters, nylons, and combinations thereof.

12. The process of claim 11, wherein polymeric film layer comprises about 1 wt. % to about 30 wt. % of the tackifier resin.

13. The process of claim 12, wherein the nonwoven fabric layer is joined to the polymeric film layer by a method selected from calendaring, ultrasonic bonding, and combinations thereof.

14. The process of claim 13, wherein the polymeric film layer comprises about 30 wt. % to about 95 wt. % of the polymeric material.

15. The process of claim 14, wherein the nonwoven fabric layer comprises a spunbond fabric comprised of polypropylenes, polyethylene, polyesters, and combinations thereof.

16. The process of claim 15, wherein at least one layer in addition to the polymeric film layer and the nonwoven fabric layer is joined to the multiple layer structure.

17. The process of claim 16, wherein the at least one additional layer is a film layer joined to the second surface of the polymeric film layer.

18. The multiple layer structure of claim 17, wherein the at least one additional layer is joined to the second surface of the polymeric film layer by coextruding the at least one additional layer and the polymeric film layer.

19. The process of claim 12 comprising coating the polymeric film layer on the nonwoven fabric layer.

20. The process of claim 19, wherein the coating has thickness of about 10 g/m$^2$ to about 100 g/m$^2$.

21. The process of claim 8, wherein the tackifier resin is provided in the polymeric film layer by blending a masterbatch comprising the tackifier resin and the polymeric material with the polymeric material.

22. The process of claim 15, wherein the tackifier resin is provided in the polymeric film layer by blending a masterbatch comprising the tackifier resin and the polymeric material with the polymeric material.

23. The process of claim 18, wherein the tackifier resin is provided in the polymeric film layer by blending a masterbatch comprising the tackifier resin and the polymeric material with the polymeric material.

24. The multiple layer structure of claim 1, wherein the tackifier resin is grafted with an unsaturated ester or anhydride.

25. The multiple layer structure of claim 24, wherein the tackifier resin is maleic anhydride functionalized.

26. The multiple layer structure of claim 1, wherein the bond strength between the first polymeric film coating layer and the nonwoven layer is at least about 0.6 lbs at 110° C. as measured by the force required to separate the polymeric film layer and the nonwoven fabric layer was recorded as the peel force.

* * * * *